United States Patent
Lee et al.

(10) Patent No.: US 12,372,548 B2
(45) Date of Patent: Jul. 29, 2025

(54) ELECTRONIC DEVICE AND METHOD FOR DETERMINING USER'S POSTURE USING ACCELERATION SENSOR OF WEARABLE ELECTRONIC DEVICE

(71) Applicant: Samsung Electronics Co., Ltd., Gyeonggi-do (KR)

(72) Inventors: Wonhee Lee, Gyeonggi-do (KR); Jaehyuk Choi, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 188 days.

(21) Appl. No.: 17/896,460

(22) Filed: Aug. 26, 2022

(65) Prior Publication Data
US 2022/0404391 A1 Dec. 22, 2022

Related U.S. Application Data

(63) Continuation of application No. PCT/KR2022/000244, filed on Jan. 6, 2022.

(30) Foreign Application Priority Data

Jan. 13, 2021 (KR) .................. 10-2021-0004794

(51) Int. Cl.
*G01P 15/18* (2013.01)
(52) U.S. Cl.
CPC .................. *G01P 15/18* (2013.01)
(58) Field of Classification Search
CPC .......... G01P 15/18; G01P 21/00; G06F 3/017; G06F 3/14; G06F 3/16; G06F 3/0346; G06F 3/012; G06F 3/013; G06F 3/038
See application file for complete search history.

(56) References Cited

U.S. PATENT DOCUMENTS 9,043,041 B2  5/2015  Willis et al.
10,185,389 B2  1/2019  Hirota et al.
(Continued)

FOREIGN PATENT DOCUMENTS

JP  9-106322 A  4/1997
JP  4592360 B2  12/2010
(Continued)

OTHER PUBLICATIONS

Korean Office Action dated Jan. 16, 2025.
Korean Notice of Patent Grant dated Jun. 17, 2025.

*Primary Examiner* — Stephen D Meier
*Assistant Examiner* — Leo T Hinze
(74) *Attorney, Agent, or Firm* — Cha & Reiter, LLC

(57) ABSTRACT

According to certain embodiments, a wearable electronic device comprises: an accelerometer which outputs acceleration data for a movement of the wearable electronic device in real time; an output device which outputs audio or video data; and a processor electrically coupled to the accelerometer and the output device, wherein the processor is configured to: output a first guide using the output device, the first guide commanding a user to keep their head still; output a second guide using the output device, the second guide commanding the user to rotate their head about a predetermined one of a roll, pitch, and yaw axis; and output information on a posture of the user wearing the wearable electronic device, determined based on another acceleration data being output from the accelerometer, after outputting the second guide.

19 Claims, 15 Drawing Sheets

(56) References Cited

U.S. PATENT DOCUMENTS

| | | | |
|---|---|---|---|
| 10,309,785 | B1 | 6/2019 | Menon et al. |
| 10,760,904 | B2 | 9/2020 | Yamada et al. |
| 2016/0291688 | A1 | 10/2016 | Hirota et al. |
| 2016/0363992 | A1 | 12/2016 | Welti |
| 2017/0036111 | A1 | 2/2017 | Shigeta et al. |
| 2018/0224273 | A1 | 8/2018 | Yamada et al. |
| 2018/0232063 | A1 | 8/2018 | Park et al. |
| 2019/0265270 | A1 | 8/2019 | Yamashita et al. |
| 2021/0397250 | A1* | 12/2021 | Akgul ............... G06F 3/0346 |

FOREIGN PATENT DOCUMENTS

| | | |
|---|---|---|
| JP | 6447514 B2 | 1/2019 |
| JP | 6533590 B2 | 6/2019 |
| KR | 10-1250215 B1 | 4/2013 |
| KR | 10-2014-0000378 A | 1/2014 |
| KR | 10-2016-0147735 A | 12/2016 |
| KR | 10-2017-0000092 A | 1/2017 |
| KR | 10-2017-0022145 A | 3/2017 |
| KR | 10-2073723 B1 | 2/2020 |
| WO | 2018/088042 A1 | 5/2018 |

\* cited by examiner

ELECTRONIC DEVICE AND METHOD FOR DETERMINING USER'S POSTURE USING ACCELERATION SENSOR OF WEARABLE ELECTRONIC DEVICE

CROSS-REFERENCE TO RELATED APPLICATION(S)

This application is a continuation application of, based on and claims priority under 35 U.S.C. § 120 to PCT International Application No. PCT/KR2022/000244, which was filed on Jan. 6, 2022, and claims priority to Korean Patent Application No. 10-2021-0004794, filed on Jan. 13, 2021, in the Korean Intellectual Property Office, the disclosures of which are incorporated by reference herein their entireties.

TECHNICAL FIELD

Certain embodiments of the disclosure relate to a wearable electronic device (e.g., a head-worn electronic device), and more particularly, to a method of determining a posture of a user wearing a wearable electronic device with respect to an angle of lowering a user's head, and an electronic device thereof.

BACKGROUND

When a user uses a smart electronic device for a long time with an inappropriate angle between a user's head and body, there is a risk of musculoskeletal disorders around a neck. Initially, the user may feel temporary stiffness, but over long periods of time, various tendons may wear out. Accordingly, there is a growing need for a technique which monitors a posture (or a neck posture) of the user. In addition, a result of monitoring the user's posture may be utilized to design various services as default information for the user.

In order to monitor an actual user's posture, an initial wearing posture of the user wearing the wearable electronic device (or a True Wireless Stereo (TWS)) is estimated and corrected by default so that an angle of lowing a head can be recognized in practice. Since an azimuth angle cannot be measured with an accelerometer alone, the user's initial wearing posture can be recognized and corrected by using the accelerometer together with a gyro sensor or by using the accelerometer together with a geomagnetic sensor.

In case of a wearable electronic device, it is difficult to mount a geomagnetic sensor without disturbance due to a characteristic of the device which is small in size and utilizes a lot of magnets. In addition, a gyro sensor is also difficult to use in the wearable electronic device in terms of economy of scale or current consumption. As such, since methods of determining a user's posture by using the geomagnetic sensor or the gyro sensor together cannot be used in the wearable electronic device or are limited in use, a new type of posture recognition technique is required to develop various services which utilize the user's posture.

SUMMARY

A wearable electronic device according to certain embodiments of the disclosure may determine a roll angle and a pitch angle and estimates a yaw angle, entirely by using an accelerometer. Thus, a user's initial wearing posture can be recognized and corrected, and a neck posture (or an angle of lowering a head) of the user wearing the wearable electronic device can be determined According to certain embodiments, a wearable electronic device comprises: an accelerometer which outputs acceleration data for a movement of the wearable electronic device; and a processor electrically coupled to the accelerometer, wherein the processor is configured to: determine a roll angle value and a pitch angle value, based on static acceleration data; estimate a yaw angle value, based on dynamic acceleration data; correct another acceleration data being output from the accelerometer, based on the roll angle value, the pitch angle value, and the estimated yaw angle value; and determine the posture of the user wearing the wearable electronic device, based on the corrected another acceleration data.

According to certain embodiments, a method of determining a posture of a user by using an accelerometer of a wearable electronic device comprises: determining a roll angle value and a pitch angle value, based on static acceleration data; estimating a yaw angle value, based on dynamic acceleration data; correcting another acceleration data being output from the accelerometer, based on the roll angle value, the pitch angle value, and the estimated yaw angle value; and determining the posture of the user wearing the wearable electronic device, based on the another corrected acceleration data and another acceleration data.

According to certain embodiments, a wearable electronic device comprises: an accelerometer which outputs acceleration data for a movement of the wearable electronic device in real time; an output device which outputs audio or video data; and a processor electrically coupled to the accelerometer and the output device, wherein the processor is configured to: output a first guide using the output device, the first guide commanding a user to keep their head still; output a second guide using the output device, the second guide commanding the user to rotate their head about a predetermined one of a roll, pitch, and yaw axis; and output information on a posture of the user wearing the wearable electronic device, determined based on another acceleration data being output from the accelerometer, after outputting the second guide.

According to certain embodiments of the disclosure, a roll angle value and a pitch angle value are determined based on static acceleration data, and a yaw angle value is estimated based on dynamic acceleration data. Therefore, an absolute posture of a user wearing a wearable electronic device can be determined on a real-time basis by correcting the acceleration data, thereby providing various services related to the posture.

According to certain embodiments of the disclosure, when estimating a yaw angle value of a wearable electronic device, an optimized algorithm is used by considering that a roll reference axis and a pitch reference axis differ by 90 degrees, thereby decreasing a computational amount and a required time.

In addition thereto, various effects which are directly or indirectly understood through the disclosure may be provided.

DESCRIPTION OF DRAWINGS

With regard to the description of the drawings, similar reference numerals may be used to refer to similar or related elements.

DETAILED DESCRIPTION

Figure 1:
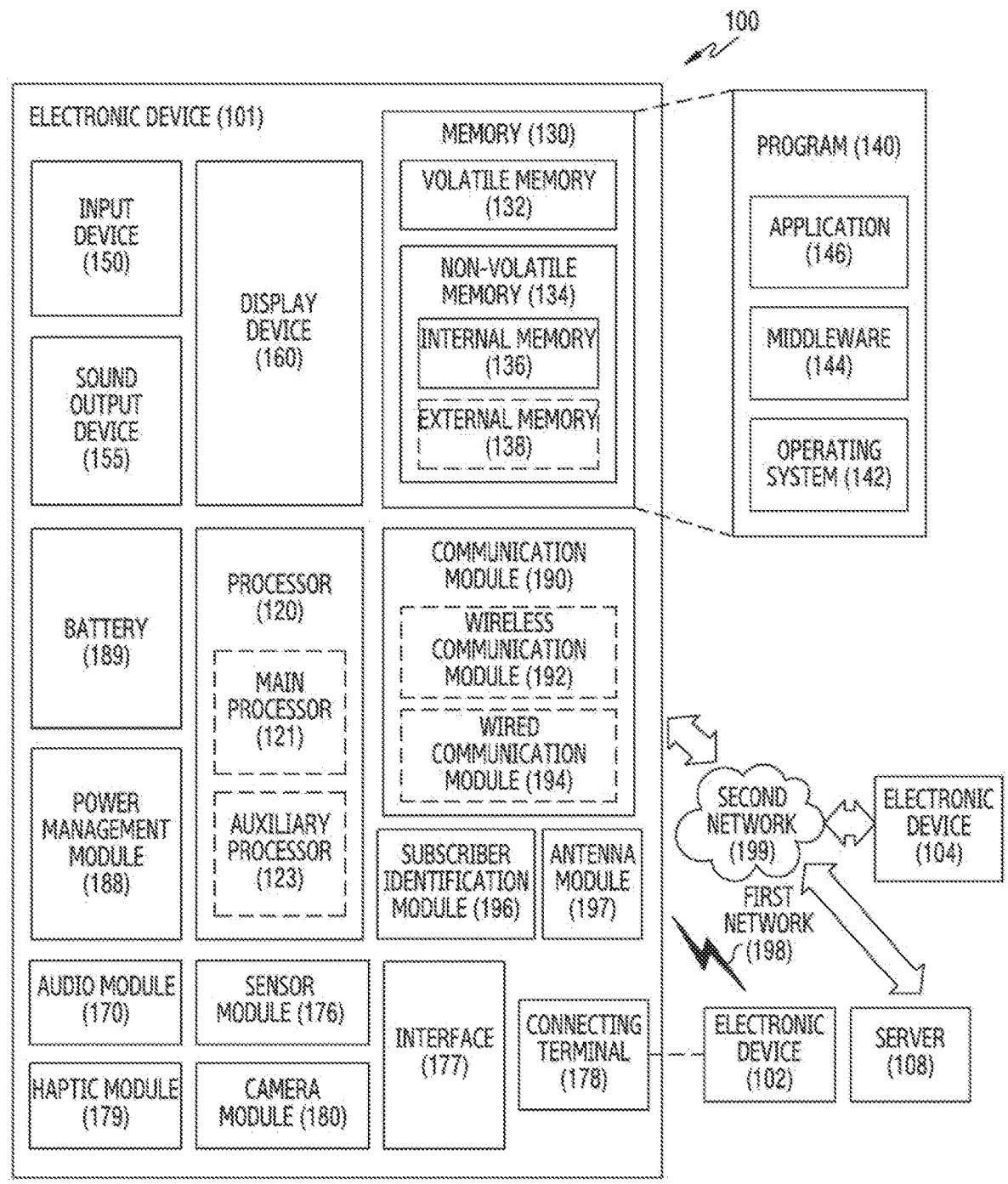
FIG. 1 is a block diagram of an external electronic device in a network environment according to certain embodiments.

Hereinafter, certain embodiments of the disclosure will be described in detail with reference to the accompanying drawings. Components shown in the drawings may be exaggerated or reduced in size for convenience of explanation, and the disclosure is not necessarily limited thereto.

Wearable Electronic Device

This document will begin by disclosing certain embodiments of wearable electronic devices. A wearable electronic device can be an electronic device that is configured to be affixed or disposed on the human body. In certain embodiments, the wearable electronic device can be paired with an external electronic device. FIG. 1 describes an electronic device.

1. Electronic Device

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The term "processor" as used in this document shall be understood to refer to both the singular and plural contexts.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

The antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic devices may include, for example, a portable communication device (e.g., a smartphone), a computer device, a portable multimedia device, a portable medical device, a camera, a wearable device, or a home appliance. The electronic devices are not limited to those described above.

In certain embodiments, electronic device 102 may be a wearable electronic device, and electronic device 101 may be an external electronic device. The wearable electronic device 102 may communicate with the external electronic device 101 using a BlueTooth connection of Wi-Fi Direct.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

2. Wearable Electronic Devices

As noted above, the electronic device 102 can be a wearable electronic device while electronic device 101 can be an external electronic device.

Figure 2:
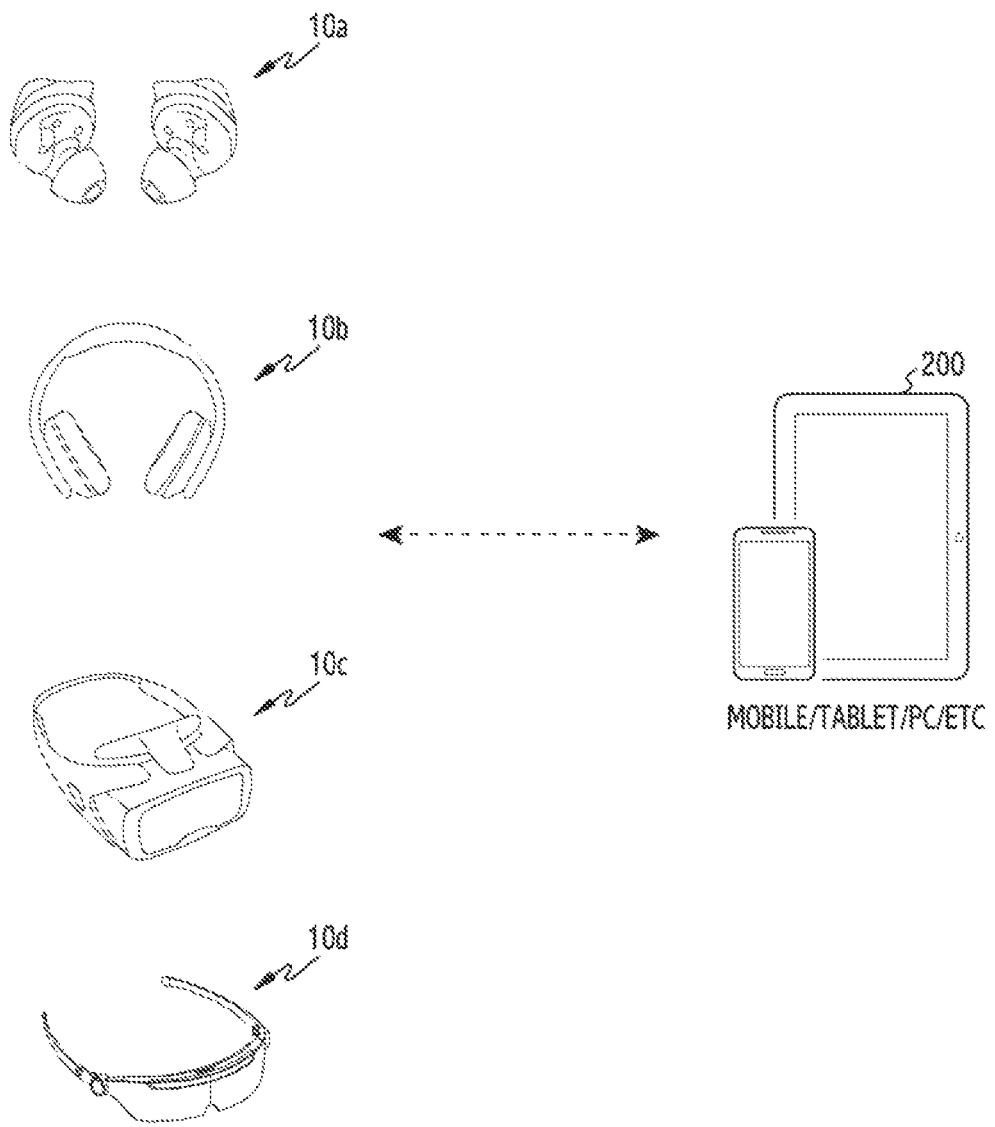
FIG. 2 is an exemplary view illustrating a wearable electronic device and an external electronic device according to certain embodiments.

FIG. 2 is a view illustrating a wearable electronic device 10 and an external electronic device 200 according to certain embodiments.

The wearable electronic device 10 may include various types of electronic devices that are worn on a user's body. For example, the wearable electronic device 10 may include a canal-type earphone (or in-ear earphone) 10*a*, a headset (or headphone) 10*b*, a Head Mounted Display (HMD) 10*c*, and/or an glasses-type electronic device 10*d*. However, the type of the wearable electronic device 10 is not limited to that illustrated in FIG. 2, and may include all of various types of electronic devices worn on the user's head to output audio or video data.

The canal-type earphone 10*a* may be configured as a pair so as to be worn on both ears of the user. For example, the canal-type earphone 10*a* may include a first audio output device that can be worn on a user's right ear and a second audio output device that can be worn on a user's left ear.

The headset 10*b* may be configured as one device in such a manner that a pair of audio output modules are connected through a connection member.

The HMD device 10*c* and the glasses-type electronic device 10*d* may include a display panel capable of outputting video in front of user's eyes when the devices are worn.

Although the canal-type earphone (or an in-ear earphone) 10*a* will be focused in the description on the wearable electronic device 10 of the disclosure, without being limited thereto, the disclosure may apply to various types of the wearable electronic devices 10.

The wearable electronic device 10 may be activated while worn on the user's body to provide the user with audio data and/or video data. The wearable electronic device 10 may output audio and/or video by using wireless data transmission/reception with the external electronic device 200. For example, a path for the wireless data transmission/reception may include at least one of a path for a Bluetooth communication scheme, a path for a Bluetooth Low Energy (BLE) communication scheme, a path for a Wireless Fidelity (Wi-Fi) direct communication scheme, and a mobile communication scheme (e.g., Long Term Evolution (LTE), sidelink)).

When the wearable electronic device 10 is configured as a pair of devices, only any one of the pair of devices may produce the communication path with the external electronic device 200. For example, the external electronic device 200 may be coupled to a first device out of the pair of the wearable electronic devices 10. When the external electronic device 200 is coupled to the first device, the external electronic device 200 or the first device may provide information on the communication path to a second device so that the second device can output the audio. The first device which is coupled to the external electronic device 200 may be called a master device or a main device, and the second device which is not coupled with the external electronic device 200 may be called a slave device or a sub device.

A device corresponding to the master device out of the pair of wearable electronic devices 10 may play a role of transmitting data generated in the wearable electronic device 10 to the external electronic device 200. For example, the master device may transmit the data generated in the wearable electronic device 10 (e.g., information on a neck posture of the user wearing the wearable electronic device 10) or may transmit state information (e.g., battery residual capacity) of the wearable electronic device 10.

Figure 3:
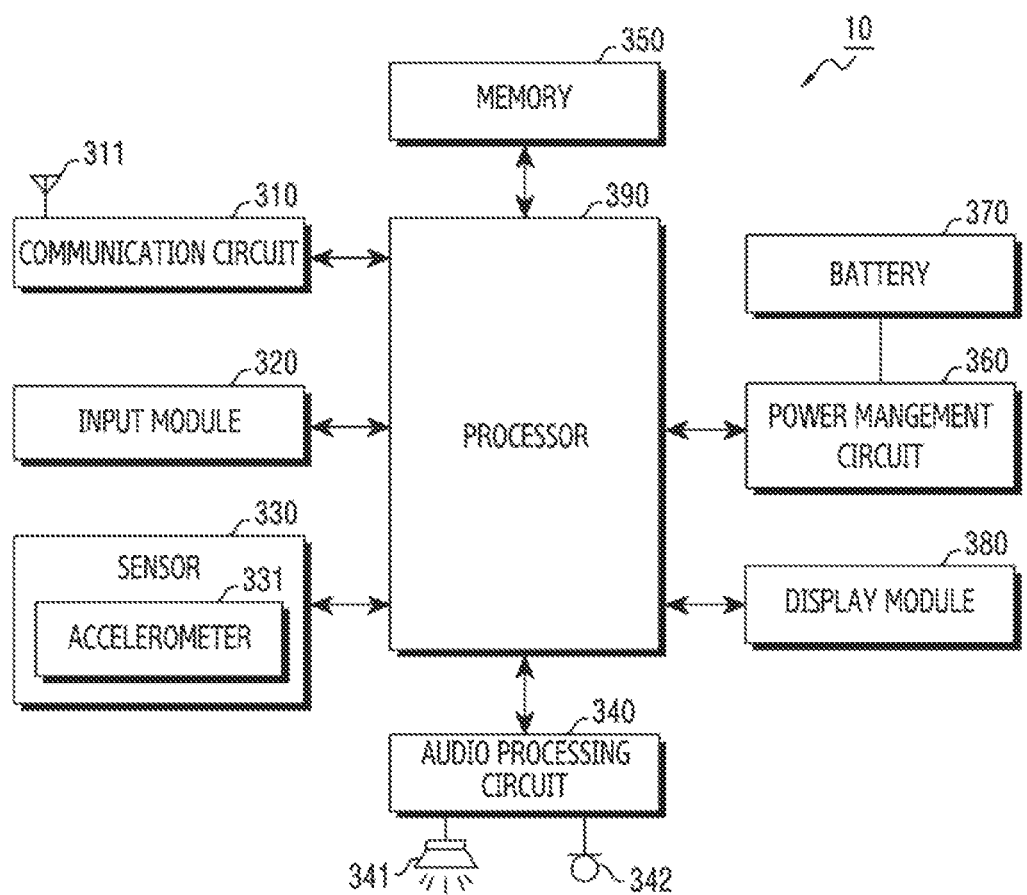
FIG. 3 is a block diagram illustrating a wearable electronic device according to an embodiment.

FIG. 3 is a block diagram illustrating a wearable electronic device 10 according to an embodiment.

Referring to FIG. 3, the wearable electronic device 10 (e.g., a first device and/or a second device out of a pair of wearable electronic devices) may include a plurality of electronic components disposed to an inner space. The wearable electronic device 10 may include a communication circuit 310 (e.g., the communication module 190 of FIG. 1), an antenna 311 (e.g., the antenna module 197 of FIG. 1), an input module 320 (e.g., the input module 150 of FIG. 1), a sensor 330 (e.g., the sensor module 176 of FIG. 1), an audio processing circuit 340 (e.g., the audio module 170 of FIG. 1), a speaker 341 (e.g., the sound output module 155 of FIG. 1), a microphone 342 (e.g., the input module 150 of FIG. 1), a memory 350 (e.g., the memory 130 of FIG. 1), a power management circuit 360 (e.g., the power management module 188 of FIG. 1), a battery 370 (e.g., the battery 189 of FIG. 1), a display module 380 (e.g., the display module 160 of FIG. 1), and/or a processor 390 (e.g., the processor 120 of FIG. 1). However, without being limited thereto, at least one of the electronic components may be omitted, or other electronic components may be further included. According to an embodiment, identical components in FIG. 1 and FIG. 3 may perform the same function.

In the disclosure, the wearable electronic device 10 may be at least one of the first device and the second device, or may be a device coupled for communication with an external electronic device 200 out of the first device and the second device (e.g., a master device when the first device and the second device are coupled for communication with the external electronic device 200).

The antenna (or antenna radiator) 311 may support various types of communication. The antenna 311 may support short-range communication. The short-range commination may include, for example, at least one of Wireless Fidelity (WiFi), Bluetooth, Bluetooth Low Energy (BLE), Near Field Communication (NFC), Global Navigation Satellite System (GNSS), and Ultra Wide Band (UWB).

The antenna 311 may support cellular communication. The cellular communication may include at least one of, for example, Long-Term Evolution (LTE), LTE Advance (LTE-A), Code Division Multiple Access (CDMA), Wideband CDMA (WCDMA), Universal Mobile Telecommunications System (UNITS), Wireless Broadband (WiBro), and Global System for Mobile Communications (GSM).

The wireless communication circuit 310 may support various types of communication by using the antenna 311. The wireless communication circuit 310 may support reception of audio data from an external device (e.g., a server, a smartphone, a PC, a PDA, or an access point). The wireless communication circuit 310 may support transmission of audio data by using an external device (e.g., another audio output device).

The input module 320 may be configured to generate various input signals required to operate the wearable electronic device 10. The input module 320 may include a touch pad, a touch panel, and/or a button. For example, the touch pad may recognize a touch input by using at least one of an electrostatic type, a pressure-sensitive type, an ultra-red type, and an ultrasonic type. For example, the button may include a physical button and/or an optical button.

The input module 320 may generate a user input for power-on/off of the wearable electronic device 10. The input module 320 may generate a user input for a communication (e.g., short-range communication) connection with the wearable electronic device 10 and the external electronic device 200.

The input module 320 may generate a user input associated with audio data (or audio content). For example, the user input may be associated with a function such as starting a playback of the audio data, pausing the playback, stopping the playback, controlling a playback speed, controlling a playback volume, or muting.

The sensor 330 may output physical data associated with the wearable electronic device 10 or may detect an operating state of the wearable electronic device 10. In addition, the sensor 330 may convert measured or detected information into an electric signal. The sensor 330 may include an accelerometer 331, and may further include at least one of a proximity sensor, a magnetic sensor, a gesture sensor, a grip sensor, and a biometric sensor. The sensor 330 may not include the gyro sensor and the geomagnetic sensor. Alternatively, even if the sensor 330 includes the gyro sensor and the geomagnetic sensor, data obtained from the gyro sensor and geomagnetic sensor may not be used in a process of determining a user's posture.

The accelerometer 331 may be disposed to an inner space of a housing constituting an exterior of the wearable electronic device 10. The accelerometer 331 according to an embodiment may sense a linear movement corresponding to 3 axes (e.g., x-axis, y-axis, and z-axis) of the wearable electronic device 10 and/or acceleration information on the 3 axes of the wearable electronic device 10. The accelerometer 331 may use the sensed data to measure a magnitude of acceleration for the movement of the wearable electronic device 10, and may measure strength (vector) applied to the wearable electronic device 10. For example, when there is no movement of the wearable electronic device 10, a value corresponding to acceleration of gravity is measured, and when there is a movement of the wearable electronic device 10, a value corresponding to a change in the acceleration of gravity in a corresponding direction may be measured.

The accelerometer 331 may detect a signal or information regarding whether the wearable electronic device 10 is worn on a user's body, and may determine a signal or information regarding a posture of the user (i.e., a neck posture of the user) wearing the wearable electronic device 10. The posture of the user may include information on an angle of lowering a user's head with respect to the user's body in a state where the user wears the wearable electronic device 10.

The audio processing circuit 340 may support a function of collecting audio data, and may reproduce the collected audio data. The audio processing circuit 340 may include an audio decoder and a D/A converter. The audio decoder may convert audio data stored in the memory 350 into a digital audio signal, and the D/A convert may convert the digital audio signal converted by the audio decoder into an analog audio signal. The audio decoder may convert audio data received from an external device (e.g., a server, a smartphone, a PC, a PDA, or an access point) via the wireless communication circuit 310 and stored in the memory 350 into a digital audio signal. The speaker 341 may output the analog audio signal converted by the D/A converter. The audio processing circuit 340 may include an A/D converter.

The A/D converter may convert the analog audio signal transferred via the microphone 342 into a digital audio signal.

The audio processing circuit 340 may reproduce a variety of audio data set in the operating of the wearable electronic device 10. For example, the audio processing circuit 340 may be designed to reproduce audio data related to a corresponding sound effect or audio guide upon detecting that the wearable electronic device 10 is worn on an ear or is separated from the ear. As another example, the audio processing circuit 340 may be designed to reproduce audio data related to a corresponding sound effect or audio guide upon detecting that the posture of the user wearing the wearable electronic device 10 corresponds to a preset posture (e.g., a posture in which a neck is bent enough to cause turtle neck syndrome). According to an embodiment, outputting of the sound effect or audio guide may be omitted by a user setting or designer's intention.

The memory 350 may store various operating systems required to operate the wearable electronic device 10, and data or application programs and algorithms or the like corresponding to various user's functions. The memory 350 may include, for example, a fast random access memory and/or a non-volatile memory such as one or more magnetic disc storage devices, one or more optical storage devices, and/or a flash memory (e.g., NAND, NOR).

The memory 350 may include a non-volatile memory which stores non-volatile audio data received from the external device (e.g., the server, the smartphone, the PC, the PDA, of the access point). The memory 350 may include a volatile memory which stores volatile audio data received from the external device.

The power management circuit 360 (e.g., a Power Management Integrated Circuit (PMIC)) may effectively manage and optimize a power usage of the battery 370 in the wearable electronic device 10. The processor 390 may transmit to the power management circuit 360 a corresponding signal depending on a load to be processed. The power management circuit 360 may regulate power to be supplied to the processor 390.

The power management circuit 360 may include a battery charging circuit. According to an embodiment, when the wearable electronic device 10 is coupled to the external device, the power management circuit 360 may be provided with power from the external device to charge the battery 370.

The display module 380 may visually provide information to the outside (e.g., the user) of the wearable electronic device 10. For example, the display module 380 may reproduce content received from the external electronic device 200 coupled for wireless communication with the wearable electronic device 10. The display module 380 may be omitted depending on a type (e.g., the canal-type earphone 10a, the headset 10b) of the wearable electronic device 10.

The processor 390 may be configured to collect a variety of data to compute a desired output value. The processor 390 may support various operations, based on at least part of the user input from the input module 320.

The processor 390 may be designed to receive audio data from the external device (e.g., the server, the smartphone, the PC, the PDA, or the access point) via the wireless communication circuit 310 and store the received audio data into the memory 350. The processor 390 may receive non-volatile audio data (or download audio data) from the external device, and may store the received non-volatile audio data into the non-volatile memory. The processor 390 may receive volatile audio data (or streaming audio data) from the external device, and may store the received volatile audio data into the volatile memory.

The processor 390 may perform various operations, based on at least part of information obtained from the sensor 330 (e.g., the accelerometer). The processor 390 may compute data for a rotation motion (i.e., a roll angle value, a pitch angle value, a yaw angle value) of the wearable electronic device 10 by using acceleration data sensed in the accelerometer 331. The processor 390 may determine the posture of the user wearing the wearable electronic device 10, based on the data obtained from the sensor 330. For example, the processor 390 may determine how much the neck of the user wearing the wearable electronic device 10 is lowered with respect to the user's body, based on the acceleration data obtained from the accelerometer.

The wearable electronic device 10 may further include various components depending on the provided type. In addition, the wearable electronic device 10 may exclude specific components among the aforementioned components depending on the provided type or may be replaced with another component.

When a user uses an electronic device 10, 200 for a long time with an inappropriate angle between a user's head and body, there is a risk of short-term stiffness in the neck, and long-term musculoskeletal disorders. A wearable electronic device according to certain embodiments of the disclosure may determine a roll angle and a pitch angle and estimates a yaw angle, entirely by using an accelerometer. Thus, a user's initial wearing posture can be recognized and corrected, and a neck posture (or an angle of lowering a head) of the user wearing the wearable electronic device can be determined.

Determining User's Posture

Figure 4:
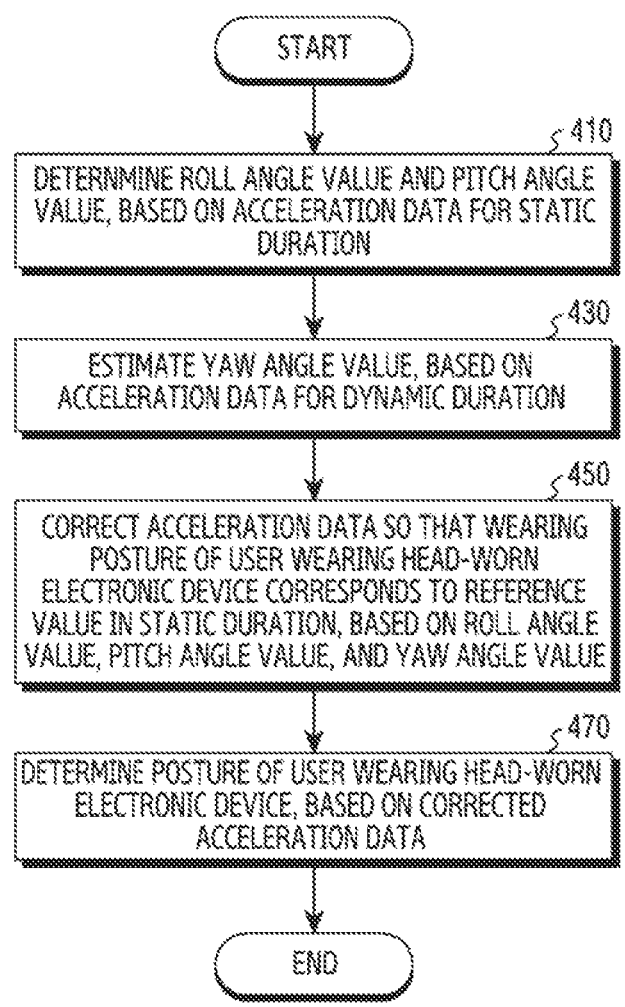
FIG. 4 is a flowchart illustrating a method of determining a user's posture by using an accelerometer of a wearable electronic device according to an embodiment.

FIG. 4 is a flowchart illustrating a method of determining a user's posture by using the accelerometer 331 of the wearable electronic device 10 according to an embodiment.

In the following embodiments, respective operations may be performed sequentially, but are not necessarily performed sequentially. Orders of the respective operations may be changed, and at least two operations may be performed in parallel.

The operations of FIG. 4 may be performed by the wearable electronic device 10 of FIG. 3. Referring to FIG. 4, the processor 390 of the wearable electronic device 10 according to an embodiment may perform an operation 410 of determining a roll angle value and a pitch angle value, based on acceleration data for a static duration in which the acceleration data has a static value (static acceleration data), an operation 430 of estimating a yaw angle value, based on acceleration data for a dynamic duration in which the acceleration data has a dynamic value (dynamic acceleration data), an operation 450 of correcting another acceleration data so that a wearing posture of a user wearing the wearable electronic device 10 in the static duration corresponds to a reference value, such as staring straight ahead, based on the roll angle value, the pitch angle value, and the yaw angle value, and an operation 470 of determining the posture of the user wearing the wearable electronic device 10, based on the corrected acceleration data. For example, the processor can receive acceleration data during a later time, correct the acceleration data received during the later time, and based on the corrected acceleration data, determine the posture of the user. Hereinafter, each operation of FIG. 4 will be described in detail.

In operation 410, the processor 390 may determine the roll angle value and the pitch angle value, based on the acceleration data for the static duration in which the acceleration data has the static value. In operation 430, the processor 390 may estimate the yaw angle value, based on the acceleration data for the dynamic duration in which the acceleration data has the dynamic value. For example, the acceleration data may have a static value in a motion (posture) in which the user wearing the wearable electronic device 10 remains still while looking straight ahead. The acceleration data may have a dynamic value in a motion in which the user wearing the wearable electronic device 10 nods the user's head up and down.

Hereinafter, roll, pitch, and yaw will be described with reference to FIG. 5.

Figure 5:
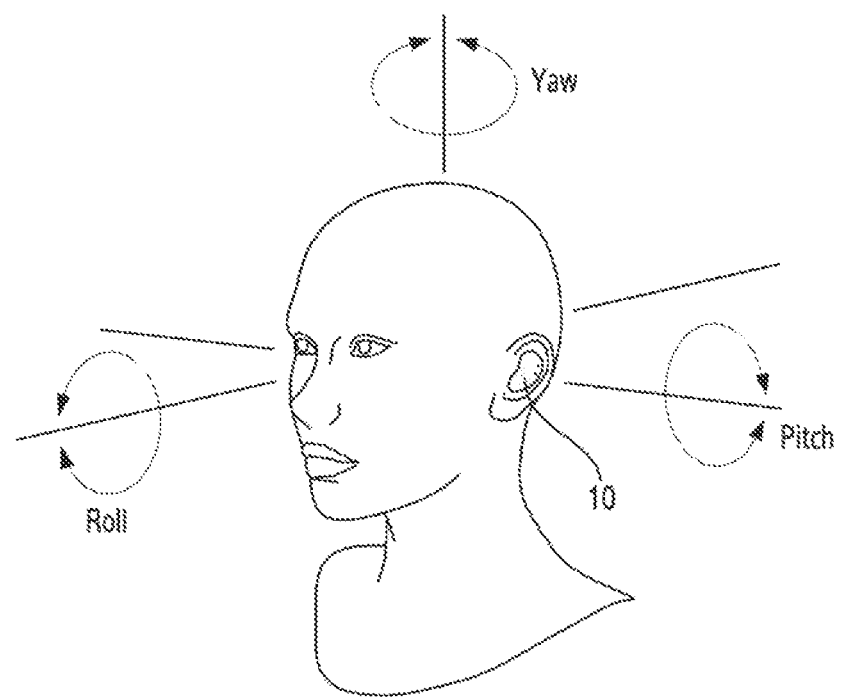
FIG. 5 is an exemplary diagram illustrating roll, pitch, and yaw for a user wearing a wearable electronic device according to an embodiment.

FIG. 5 is a diagram illustrating roll, pitch, and yaw for a user wearing the wearable electronic device 10 according to an embodiment.

The accelerometer 331 mounted on the wearable electronic device 10 may output acceleration data for a set x-axis, y-axis, and z-axis, and the processor 390 may use the acceleration data to obtain information (e.g., a roll angle value, a pitch angle value) for a rotation motion of the wearable electronic device 10. The roll, the pitch, and the yaw may be indices for a rotation radius which rotates about the x-axis, the y-axis, and the z-axis respectively in a 3-dimensional space.

The x-axis can be deemed a line tip of the nose to the back of the head. The y-axis can be deemed a line through the ears. The z-axis can be deemed a line from the next to the top of the user's head/scalp. The roll angle value may be data for a rotation motion about the x-axis, such as the user leaning the head towards one of their shoulders. The pitch angle value may be data for a rotation motion about the y-axis, such as leaning their head forward or backwards. For example, in the gesture that is commonly used to indicate "yes" or agreement, the pitch angle is changed. The yaw angle value may be data for a rotation motion about the z-axis, such as moving their head to a left side or a right side. For example, the gesture commonly used to indicate "no", or disagreement is changing the yaw angle.

However, the axes to which the roll, pitch, and yaw angle values correspond are not limited thereto. As another example, directions of the x-axis, y-axis, and z-axis of the accelerometer 331 may be changed according to a mounting state of the accelerometer 331 in the wearable electronic device 10. For example, the roll, pitch and yaw axis of the accelerometer 331 may align with different ones of the roll, pitch and yaw axis of the user's head when the wearable electronic device is worn. In this case, among the x-axis, y-axis, and the z-axis, the axes to which the roll angle value, the pitch angle value, and the yaw angle value correspond may also be changed. That is, when the roll, pitch, and yaw values are defined such that the pitch corresponds to a rotation motion in which the user wearing the wearable electronic device 10 nods a head up and down, the yaw corresponds to a motion in which the user wearing the wearable electronic device 10 rotates the head left and right, and the roll corresponds to a motion in which the user wearing the wearable electronic device 10 rotates the head (in particular, an ear) from one shoulder to another shoulder, the axes to which the roll angle value, the pitch angle value, and the yaw angle value correspond may also change depending on the directions of the x-axis, y-axis, and z-axis of the accelerometer 331. Therefore, when the roll, pitch and yaw axis of the accelerometer do not align with the roll, pitch, and yaw axis of the user head, it, there yaw movement of the head may not correspond to yaw movement of the accelerometer.

Since a state of wearing the wearable electronic device 10, i.e., a how much the wearable electronic device 10 is tilted when worn on a user's body (or how much the wearable electronic device 10 rotates when inserted to a user's ear) is different from one user to another, a process of recognizing and correcting an initial wearing posture of the user wearing the wearable electronic device 10 can be used to determine a posture of users according to a common criterion. For example, as shown in FIG. 5, a wearing posture in which the user looks straight ahead while wearing the wearable electronic device 10 may be called the initial wearing posture, and then, acceleration data may be corrected and used thereafter according to the initial wearing posture in a process of determining the user's posture on a real-time basis.

The processor 390 of the wearable electronic device 10 may use the roll angle and pitch angle values determined for the static duration and the yaw angle value estimated for the dynamic duration to correct acceleration data. The acceleration data is corrected so that a wearing posture is the reference value of the user looking straight ahead. For example, the processor 390 may determine an angle of lowering a user's head according to the wearing posture in which the user wearing the wearable electronic device 10 looks straight ahead, through a process of correcting the acceleration data.

Figure 6:
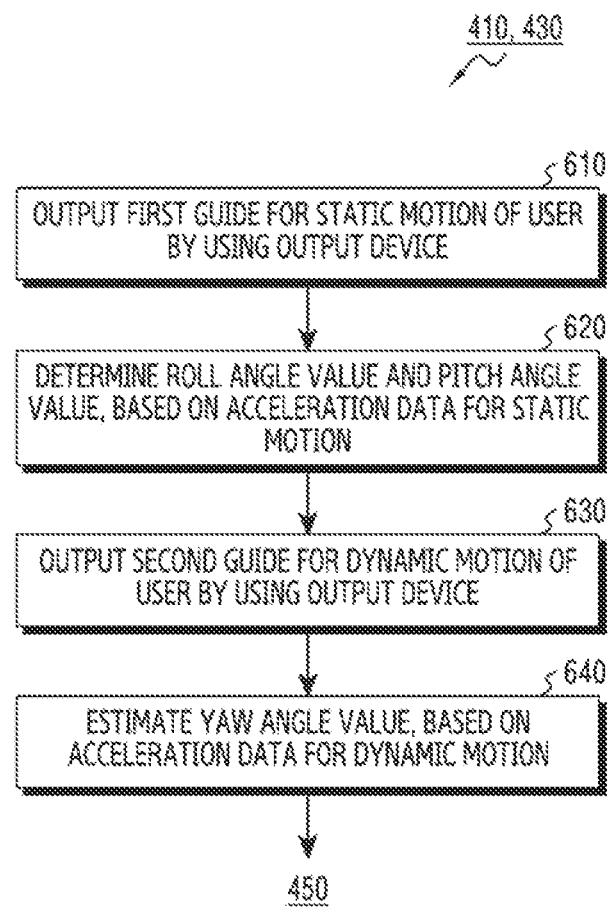
FIG. 6 is a flowchart illustrating a method of determining a roll angle value and a pitch angle value and estimating a yaw angle value according to an embodiment by using an accelerometer of a wearable electronic device.

FIG. 6 is a flowchart illustrating a method of determining a roll angle value and a pitch angle value and estimating a yaw angle value according to an embodiment by using the accelerometer 331 of the wearable electronic device 10.

The operation 410 may include an operation 610 of outputting a first guide for a static motion of a user by using an output device of the wearable electronic device 10 and an operation 620 of determining a roll angle value and a pitch angle value, based on acceleration data for the static motion. According to an embodiment, the operation 430 may include an operation 630 of outputting a second guide for a dynamic motion of the user by using an output device of the wearable electronic device 10 and an operation 640 of estimating a yaw angle value, based on the acceleration data for the dynamic motion.

In operation 610, the processor 390 according to an embodiment may output the first guide for the static motion of the user by controlling the output device (e.g., the speaker 341, the display module 380). For example, the static motion may be a motion (or posture) in which the user wearing the wearable electronic device 10 remains still while looking straight ahead. The first guide may include an audio guide and/or video guide which requests for the static motion while providing the user with an explanation for the static motion. The processor 390 may induce the static motion of the user by outputting the first guide for the static motion. In operation 620, the processor 390 according to an embodiment may determine a roll angle value and a pitch angle value, based on acceleration data for the static motion.

If it is determined based on acceleration data obtained from the accelerator 331 that the user's motion is the static option, i.e., a motion (or posture) of remaining still while looking straight ahead, the processor 390 may determine the roll angle value and the pitch angle value, based on the acceleration data. For example, if a variation of the acceleration data is less than a specific threshold, the processor 390 may determine that the motion of the user corresponds to a motion (or posture) of remaining still while looking straight ahead. According to another embodiment, the processor 390 may determine the roll angle value and the pitch angle value, based on the acceleration data obtained within a preset time after outputting the first guide for the static motion in the operation 610.

In operation 630, the processor 390 may control the output device (e.g., the speaker 341, the display module 380) to output the second guide for the dynamic motion of the user. The processor 390 may provide the user with a motion guide in which only the pitch value changes. The processor 390 may estimate the most appropriate yaw angle value through a qualitative evaluation for a result of a movement according to the guide.

As noted above, it may be not known which combination of the roll, pitch, and yaw axis of the head correspond to the roll, pitch, and yaw axis of the accelerometer. Accordingly, during operation 630, the user may be asked to make a predetermined or known head motion along a predetermined axis, e.g., the pitch. By evaluating the change in the accelerometer, the combination of axis in the accelerometer that correspond to the axis of the user's head can be determined.

Although there is no computational problem even if a motion guide in which only the roll value changes is provided, since it is more difficult to move such that only the roll value changes due to a structure of the body, a motion guide in which only the pitch value changes may be more appropriate as the second guide. For example, the dynamic motion may be a motion in which the user wearing the wearable electronic device 10 nods the user's head up and down, and the motion of nodding the head up and down may be a motion in which only the pitch value changes among the roll value, the pitch value, and the yaw value. The second guide may include an audio guide and/or video guide which requests for the dynamic motion while providing the user with an explanation for the dynamic motion. The processor 390 may induce the dynamic motion of the user by outputting the second guide for the dynamic motion. The dynamic motion guide may ask the user to move their head in a direction that changes about a known axis, such as the pitch axis. For example, the wearable electronic device 10 may output an audible message via the speakers, "please nod your head." In operation 640, the processor 390 according to an embodiment may determine a yaw angle value, based on acceleration data for the dynamic motion.

In operation 640, after outputting the second guide for the dynamic motion, the processor 390 may estimate the yaw angle value, based on acceleration data (e.g., a variation of the roll angle value and a variation of the pitch angle value) obtained within a pre-set time. For example, when the yaw angle value is not properly estimated, the roll value changes together, even though the dynamic motion in which only the pitch value changes is taken. In this case, it may be determined that the yaw angle value is incorrectly estimated, and whether it is appropriate in other yaw angle candidate values may be determined.

In operation 640, the processor 390 may determine a yaw angle candidate value of which a vibration of the roll angle value is the smallest or a yaw angle candidate value of which a variation of the roll angle value is the smallest and a variation of the pitch angle value is the greatest, for the dynamic duration, as the yaw angle value, among yaw angle candidate values between 0 and 360 degrees.

Hereinafter, the operation 430 of estimating the yaw angle value will be described in detail with reference to FIG. 7 to FIG. 10.

Figure 7:
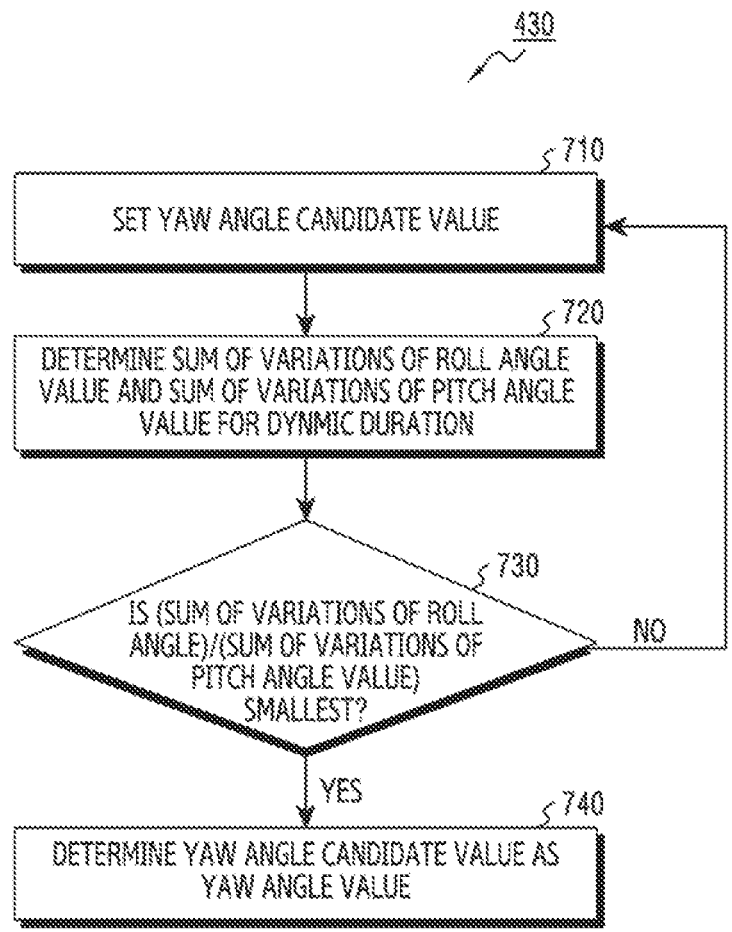
FIG. 7 is a flowchart illustrating a method of estimating a yaw angle value of a wearable electronic device according to an embodiment.

FIG. 7 is a flowchart illustrating a method of estimating a yaw angle value of the wearable electronic device 10 according to an embodiment, and FIG. 8 is a graph illustrating a sum of variations of a roll angle value and a sum of variations of a pitch angle value for a dynamic duration depending on a yaw angle candidate value.

If the yaw angle value is correctly estimated, a change in size of a roll value shall be the smallest and a change in size of a pitch value shall be the greatest for a dynamic motion in which only a pitch value changes. Operations of FIG. 7 describe a method of determining the most appropriate yaw angle value through a physical correlation among the roll angle value, the pitch angle value, and the yaw angle value.

Referring to FIG. 7, the operation 430 of estimating the yaw angle value may include an operation 710 of setting the yaw angle candidate value, an operation 720 of determining a sum of variations of a roll angle value and a sum of variations of a pitch angle value for a dynamic duration, an operation 730 of determining whether (a sum of variations of the roll angle value)/(a sum of variations of the pitch angle value) is the smallest, and an operation 740 of determining the yaw angle candidate value as the yaw angle value if (the sum of variations of the roll angle value)/(the sum of variations of the pitch angle value) is the smallest.

In operation 710, the processor 390 may set yaw angle candidate values among angles between 0 and 360 degrees with a regular interval. For example, the yaw angle candidate value may be set to a value with an interval of 0.5 degrees among values between 0 and 360 degrees, (e.g.: 0 degrees, 0.5 degrees, 1 degree, . . . , 359.5 degrees, 360 degrees) or may be set to a value with an interval of 0.1 degrees (e.g., 0 degrees, 0.1 degrees, 0.2 degrees, . . . , 359.9 degrees, 360 degrees), or optionally may be set with various intervals.

In operation 720, the processor 390 may determine a sum sumRoll of variations of a roll angle value and a sum sumPitch of variations of a pitch angle value for a dynamic duration for each yaw angle candidate value by using equation (1) below.

$$\text{sumAngle} = \sum_{i=1}^{k} |\text{Angle}(i)|$$

Angle=Roll or Pitch $k$=sensor sample number (1)

In operations 730 and 740, the processor 390 may determine a yaw angle candidate value of which a variation of the roll angle value is the smallest and a variation of the pitch angle value is the greatest. For example, the processor 390 may determine a value of (a sum of variations of the roll angle value)/(a sum of variations of the pitch angle value) for the yaw angle candidate values in operation 730, and may determine a yaw angle candidate value of which (a sum of variations of the roll angle value)/(a sum of variations of the pitch angle value) is the smallest as the yaw angle value in operation 740.

In operations 730 and 740, the processor 390 may determine a yaw angle candidate value of which a variation of the roll angle value is the smallest. For example, the processor 390 may determine a sum of variations of the roll angle value in operation 730, and may determine a yaw angle candidate value of which a sum of variations of the roll angle value is the smallest in operation 740.

Figure 8A:
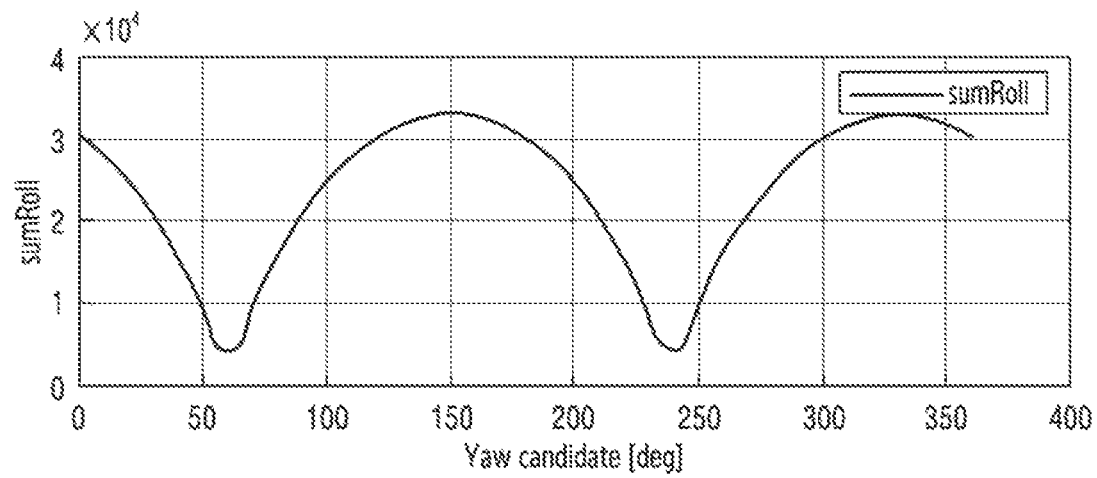
FIGS. 8A and 8B are graphs illustrating a sum of variations of a roll angle value and a sum of variations of a pitch angle value for a dynamic duration depending on a yaw angle candidate value.
Figure 8B:
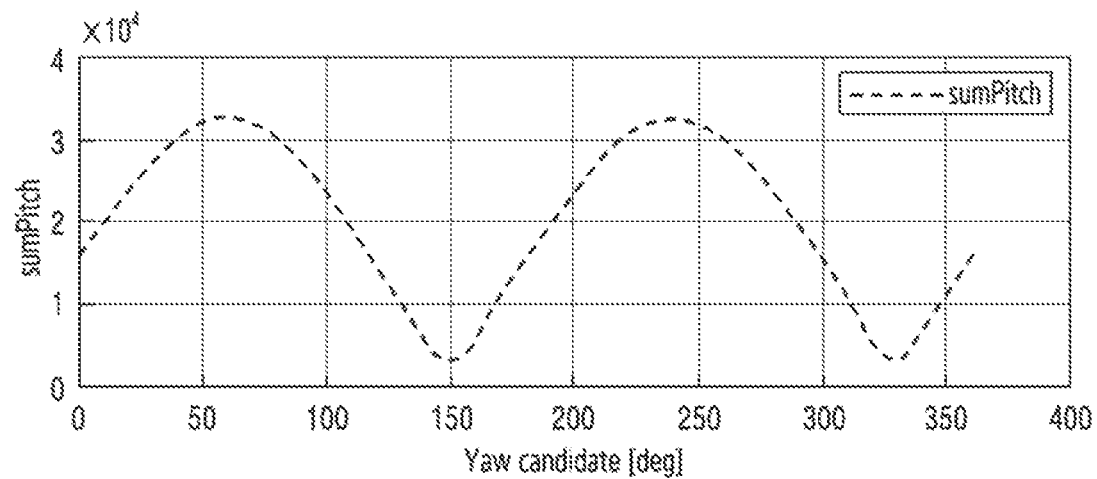

Referring to FIGS. 8A and 8B, for example, when computing a sum of variations of the roll angle value for the dynamic duration and a sum of variations of the pitch angle values for the dynamic duration with respect to the yaw angle candidate values between 0 and 360 degrees, it can be seen that the sum of variations of the roll angle value is the smallest and the sum of variations of the pitch angle value is the greatest at 61 degrees and 241 degrees. In addition, upon identifying a pitch value (or a sign of the pitch value) for whether it is a motion of lowering the user's head or a motion of raising the user's head in the dynamic duration, a yaw candidate value for 61 degrees or 241 degrees may be determined as the yaw angle value.

In the method of estimating the yaw angle value, as described above in FIG. 7 and FIGS. 8A and 8B, computation is required for the sum of variations of the roll angle value and the sum of variations of the pitch angle value for the dynamic duration with respect to all yaw angle candidate values set between 0 and 360 degrees, which results in a great computational amount. Hereinafter, a method of estimating the yaw angle, which can reduce a computational amount by 75% compared to the method of FIG. 7, will be described with reference to FIG. 9 and FIG. 10.

Figure 9:
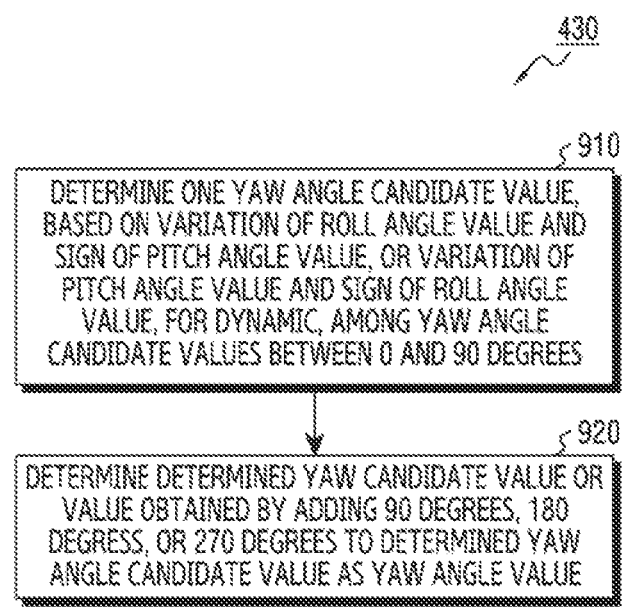
FIG. 9 is a flowchart illustrating a method of estimating a yaw angle value by using a computation algorithm of a wearable electronic device according to an embodiment.

FIG. 9 is a flowchart illustrating a method of estimating a yaw angle value by using a computation algorithm of the wearable electronic device 10 according to an embodiment.

The processor 390 may add a computation algorithm to estimate a yaw angle value by computing a sum of variations of a roll angle value and a sum of variations of a pitch angle value with respect to only a yaw angle candidate value between 0 and 90 degrees. For example, the computation algorithm may be derived by using the fact that a difference between a roll reference axis and a pitch reference axis is 90 degrees.

Referring to FIG. 9, the operation 430 of estimating the yaw angle value may include an operation 910 of determining one yaw angle candidate value, based on a variation of the roll angle value and a sign of the pitch angle value for the dynamic duration, or a variation of the pitch angle value and a sign of the roll angle value for the dynamic duration, among yaw angle candidate values between 0 and 90 degrees, and an operation 920 of determining the determined yaw angle candidate value or a value obtained by adding 90 degrees, 180 degrees, or 270 degrees to the determined yaw angle candidate value as the yaw angle value.

In operation 910, the processor 390 may determine a sum of variations of the roll angle value and a sign of the pitch angle value and/or a sum of variations of the pitch angle value and a sign of the roll angle value, for the dynamic duration, with respect to a yaw angle candidate value set with a regular interval between 0 and 90 degrees, and may determine one yaw angle candidate value according to the computation algorithm, based on the determination.

In operation 920, the processor 390 may determine the yaw angle candidate value determined in operation 910, a value obtained by adding 90 degrees to the determined yaw angle candidate value, a value obtained by adding 180 degrees to the determined yaw angle, or a value obtained by adding 270 to the determined yaw angle candidate value (or subtracting 90 degrees therefrom) as the yaw angle value according to the computation algorithm.

Figure 10:
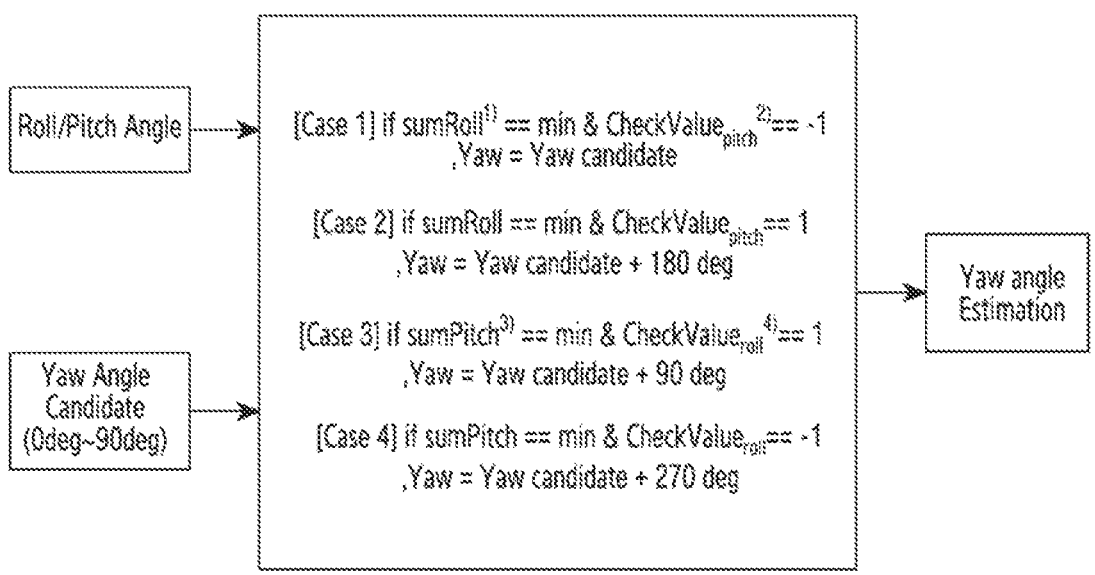
FIG. 10 is a schematic view illustrating a computation algorithm for estimating a yaw angle value of a wearable electronic device according to an embodiment.

FIG. 10 is a schematic view illustrating a computation algorithm for estimating a yaw angle value of the wearable electronic device 10 according to an embodiment.

Referring to FIG. 10, an optimal computation algorithm may be configured for four separate cases by using the fact that a roll reference axis and a pitch reference axis differ by 90 degrees. There may be four separate cases for a sum of variations of a roll angle value and a sign of a pitch angle value and/or a sum of variations of the pitch angle value and a sign of the roll angle value, for a dynamic duration, with respect to a yaw angle candidate value between 0 and 90 degrees, and the yaw angle candidate value or a value obtained by 90 degrees, 180 degrees, or 270 degrees to the yaw angle candidate value may be determined based on a corresponding case. That is, the processor 390 may estimate the yaw angle value between 0 and 360 degrees through only computation for a yaw angle candidate value set between 0 and 90 degrees.

Referring to FIG. 10, for example, if a result of computing the sum of variations of the roll angle value and the sign of the pitch angle value for the dynamic duration and the sum of variations of the pitch angle value and the sign of the roll angle value for the dynamic duration with respect to the yaw angle candidate value between 0 and 90 degrees shows that there is a yaw angle candidate value of which a sum of variations of the roll angle value is the smallest and a sign of the pitch angle is negative (−), this case may correspond to a case 1. If it is the case 1, the processor 390 may estimate the yaw angle candidate value directly as the yaw angle value.

For example, if the result of computing the sum of variations of the roll angle value and the sign of the pitch angle value for the dynamic duration and the sum of variations of the pitch angle value and the sign of the roll angle value for the dynamic duration with respect to the yaw angle candidate value between 0 and 90 degrees shows that there is a yaw angle candidate value of which a sum of variations of the roll angle value is the smallest and a sign of the pitch angle is positive (+), this case may correspond to a case 2. If it is the case 2, the processor 390 may estimate a value obtained by adding 180 degrees to the yaw angle candidate value as the yaw angle value.

For example, if the result of computing the sum of variations of the roll angle value and the sign of the pitch angle value for the dynamic duration and the sum of variations of the pitch angle value and the sign of the roll angle value for the dynamic duration with respect to the yaw angle candidate value between 0 and 90 degrees shows that there is a yaw angle candidate value of which a sum of variations of the pitch angle value is the smallest and a sign of the roll angle is positive (+), this case may correspond to a case 3. If it is the case 3, the processor 390 may estimate a value obtained by adding 90 degrees to the yaw angle candidate value as the yaw angle value.

For example, if the result of computing the sum of variations of the roll angle value and the sign of the pitch angle value for the dynamic duration and the sum of variations of the pitch angle value and the sign of the roll angle value for the dynamic duration with respect to the yaw angle candidate value between 0 and 90 degrees shows that there is a yaw angle candidate value of which a sum of variations of the pitch angle value is the smallest and a sign of the roll angle is negative (−), this case may correspond to a case 4. If it is the case 4, the processor 390 may estimate a value obtained by adding 270 degrees to the yaw angle candidate value (or a value obtained by subtracting 90 degrees from the yaw angle candidate value) as the yaw angle value.

Returning to FIG. 4, in operation 450, based on the roll angle value and pitch angle value determined in the operation 410 and the yaw angle value estimated in the operation 430, the processor 490 may correct acceleration data which is output from the accelerometer 331 according to a reference value, i.e., a wearing posture of a user wearing the wearable electronic device 10 in the static duration (i.e., a motion duration in which a user looks straight ahead while wearing the wearable electronic device 10 on the user's head). The processor 390 may correct the acceleration data such that both the roll angle value and pitch angle value in the static duration are 0, based on the roll angle value and pitch angle value determined in the operation 410, and may correct the acceleration data such that the roll angle value in the dynamic duration is 0, based on the yaw angle value estimated in the operation 430.

For example, a process of recognizing and correcting a wearing posture (or an initial wearing posture) in a user's static duration is required to determine a user's posture according to a common criterion by considering a state of wearing the wearable electronic device 10, which differs from one user to another (i.e., how much the wearable electronic device 10 is tilted when worn on a user's body). The processor 390 may correct and use the acceleration data, based on the wearing posture in the static duration, in a process of determining the user's posture on a real-time basis. The processor 390 may determine an angle of lowering the user's head such that the user's wearing posture of looking straight ahead is a reference through the process of correcting the acceleration data.

Hereinafter, the operation 450 of correcting the acceleration data will be described with reference to FIG. 11.

Figure 11:
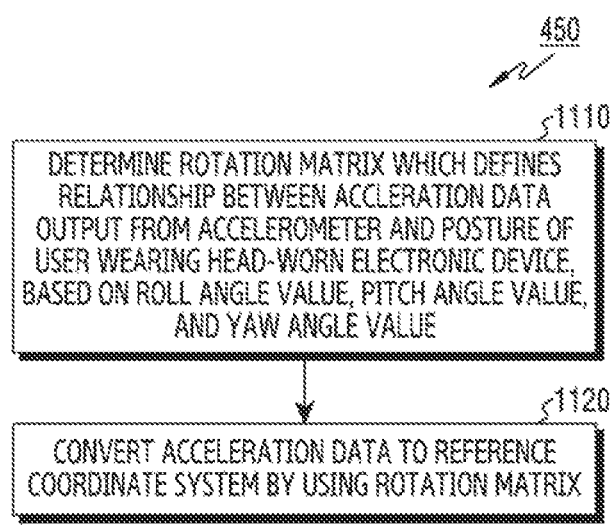
FIG. 11 is a flowchart illustrating a method of correcting acceleration data, based on a roll angle value, pitch angle value, and yaw angle value of a wearable electronic device according to an embodiment.

FIG. 11 is a flowchart illustrating a method of correcting acceleration data, based on a roll angle value, pitch angle value, and yaw angle value of the wearable electronic device 10 according to an embodiment.

Referring to FIG. 11, the operation 450 may include an operation 1110 of determining a rotation matrix which defines a relationship between acceleration data output from the accelerometer 331 and a posture of a user wearing the wearable electronic device 10, based on a roll angle value, a pitch angle value, and a yaw angle value, and an operation 1120 of converting the acceleration data to a reference coordinate system by using the rotation matrix.

According to an embodiment, in operation 1110, the processor 390 may determine the rotation matrix for correcting the acceleration data output from the accelerometer 331, based on the roll angle value and pitch angle value determined in the operation 410 and the yaw angle value estimated in the operation 430. For example, the rotation matrix may define the relationship between the acceleration data output from the accelerometer 331 and the posture of the user wearing the wearable electronic device 10. The rotation matrix may be used to convert the acceleration data, which is output to a different value despite the same situation depending on a state of wearing the wearable electronic device 10, to a common coordinate system (i.e., a reference coordinate system).

According to an embodiment, in operation 1120, the processor 390 may correct the acceleration data output from the accelerometer 331 by using the rotation matrix determined in the operation 1110. For example, the processor 390 may convert the acceleration data to the reference coordinate system, based on the rotation matrix. The reference coordinate system may be a coordinate system in which forward, right, and lower directions of the user wearing the wearable electronic device 10 in the static duration (i.e., a posture of looking straight ahead) are respectively set to an x-axis, a y-axis, and a z-axis. The processor 390 may determine a neck posture of an individual user from a common criterion irrespective of an initial wearing state of the wearable electronic device 10 through a process of correcting the acceleration data to the reference coordinate system by configuring the rotation matrix.

Returning to FIG. 4, in operation 470, the processor 390 may determine the posture of the user wearing the wearable electronic device 10, based on the acceleration data corrected in the operation 450. The processor 390 may determine the posture of the user wearing the wearable electronic device 10 on a real-time basis by using the acceleration data converted to the reference coordinate system, based on the rotation matrix. For example, the posture of the user wearing the wearable electronic device 10 may include information on a value indicating an angle of lowering a user's head with respect to a user's body in a state where the user wears the wearable electronic device 10.

The aforementioned operations 410 to 470 are descriptions on a method in which, after all of the roll angle value, the pitch angle value, and the yaw angle value are obtained, the rotation matrix is configured to correct the acceleration data at a time and the user's posture is determined. However, the orders of operations are not limited thereto, and the acceleration data may be corrected by dividing the step of correction into two steps. For example, after determining the roll angle value and the pitch angle value and primarily correcting acceleration data, based on the determined roll angle value and pitch angle value (or after primarily configuring the rotation matrix), the processor 390 may estimate the yaw angle value and finally correct the acceleration data (configure a final rotation matrix), based on the estimated yaw angle value.

Hereinafter, a process of correcting acceleration data according to an embodiment will be described with reference to FIG. 12 to FIG. 14.

Figure 12:
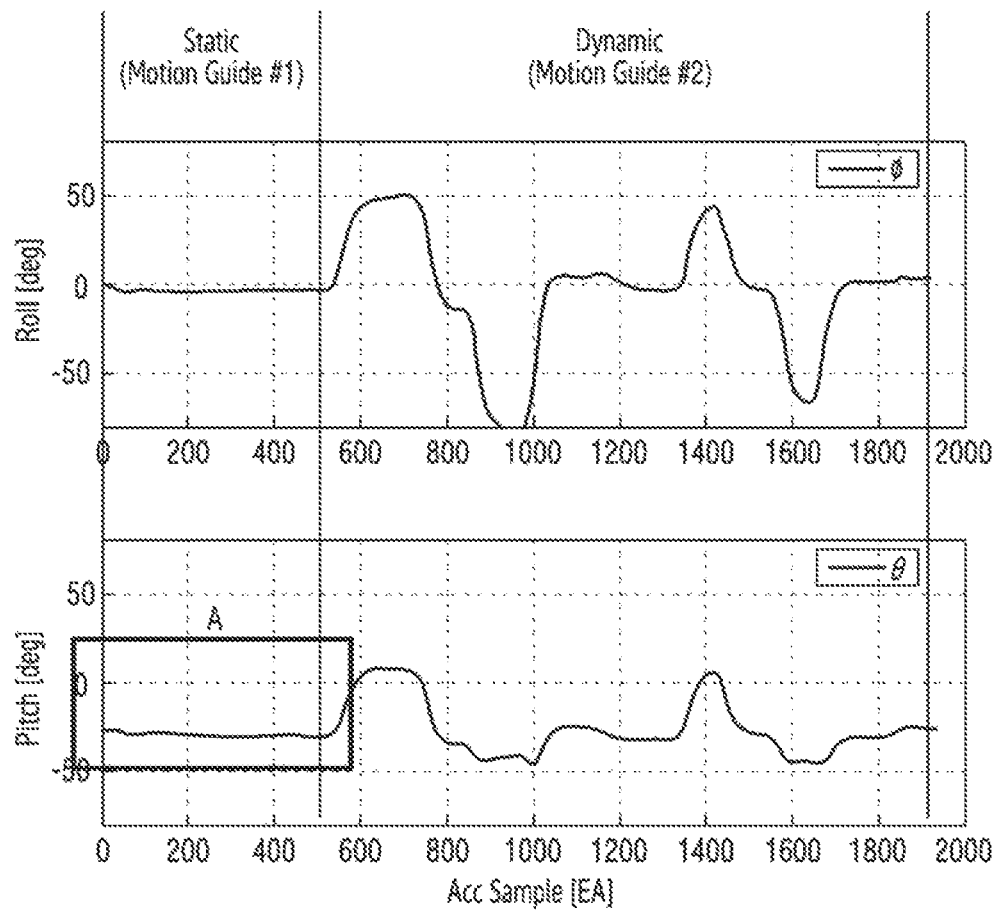
FIG. 12 is a graph illustrating a roll angle value and a pitch angle value for a static duration and dynamic duration before correcting acceleration data according to an embodiment.

FIG. 12 is a graph illustrating a roll angle value and a pitch angle value for a static duration and dynamic duration before correcting acceleration data according to an embodiment. According to an embodiment, before the process of correcting the acceleration data, at least one of the roll angle value and the pitch angle value may have a non-zero value while a user takes a static motion (posture). Referring to A of FIG. 12, while the user wearing the wearable electronic device 10 looks straight ahead (i.e., for a static duration), the pitch angle value is derived as a non-zero value (about −30 degrees). The processor 390 may correct the acceleration data such that both the roll angle value and the pitch angle value in the static duration are 0, based on the pitch angle value (and/or roll angle value) determined in the operation 410.

Figure 13:
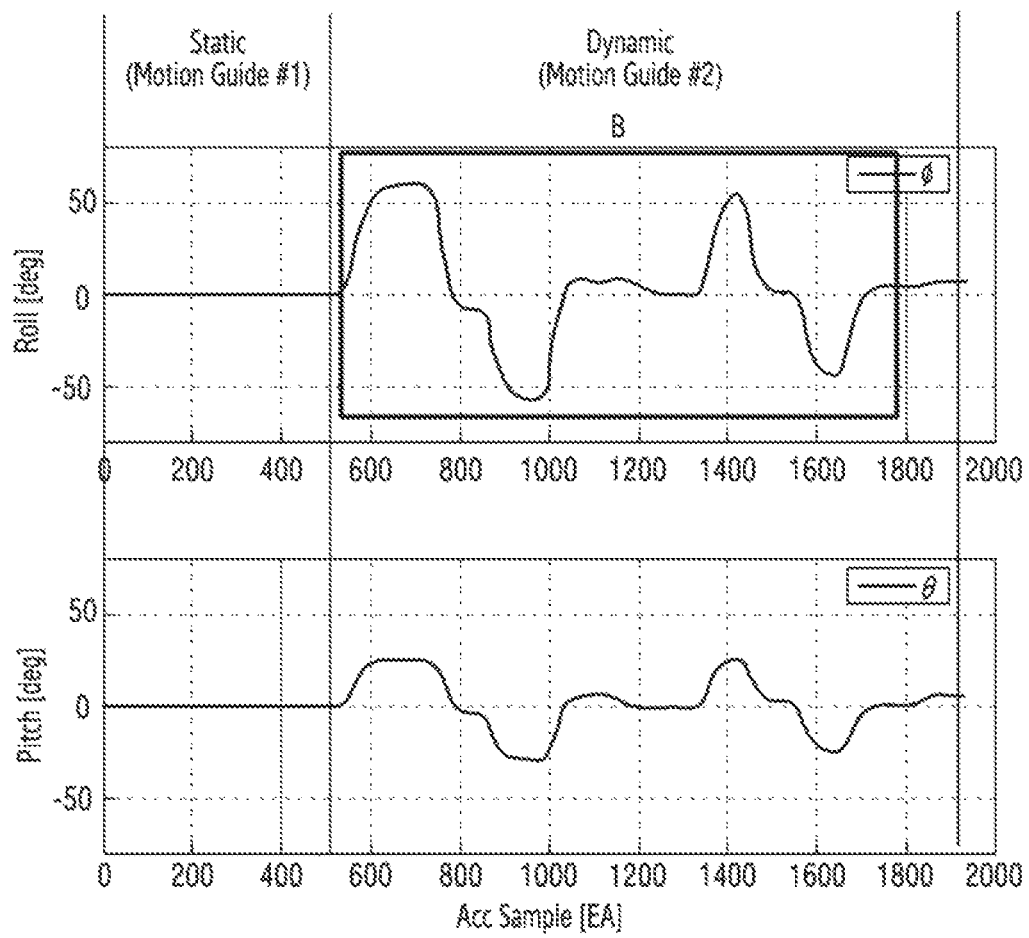
FIG. 13 is a graph illustrating a roll angle value and a pitch angle value for a static duration and a dynamic duration after correcting a roll angle and a pitch angle according to an embodiment.

FIG. 13 is a graph illustrating a roll angle value and a pitch angle value for a static duration and a dynamic duration after correcting a roll angle and a pitch angle according to an embodiment. According to an embodiment, it can be seen that, after acceleration data is corrected based on the roll angle value and pitch angle value derived for the static duration in FIG. 12, the pitch angle value (and the roll angle value) for the static duration is 0 in FIG. 13.

According to an embodiment, before a correction process using a yaw angle, the roll angle value may significantly change while a user takes a dynamic motion in which only the pitch value changes. Referring to B of FIG. 13, for a duration in which the user wearing the wearable electronic device 10 moves while nodding a user's head up and down (e.g., for a dynamic duration), the roll angle value changes significantly. The processor 390 may correct acceleration data such that the roll angle value in the dynamic duration is 0 (or a value close to 0), based on the yaw angle value estimated in the operation 430.

Figure 14:
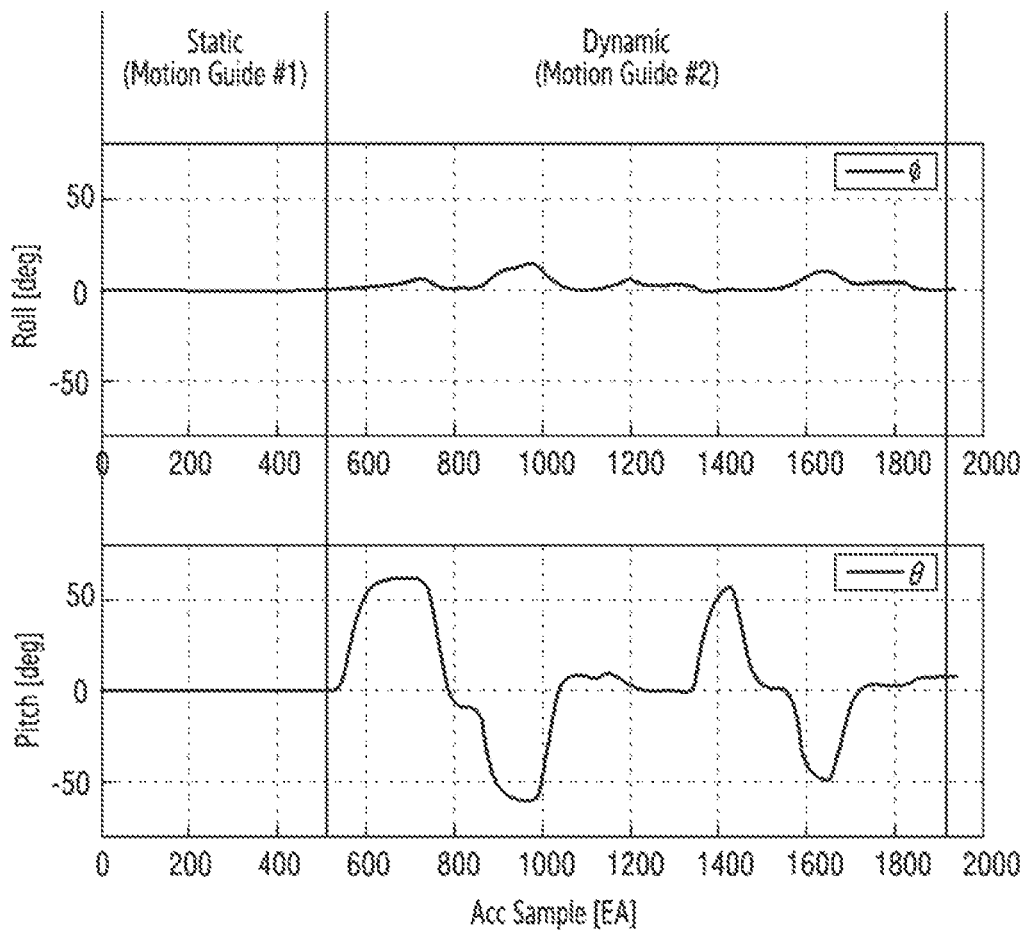
FIG. 14 is a graph illustrating a roll angle value and a pitch angle value for a static duration and a dynamic duration after correcting a roll angle, a pitch angle, and a yaw angle according to an embodiment.

FIG. 14 is a graph illustrating a roll angle value and a pitch angle value for a static duration and a dynamic duration after correcting a roll angle, a pitch angle, and a yaw angle according to an embodiment. According to an embodiment, it can be seen that, after acceleration data is corrected based on the yaw angle value estimated for the dynamic duration in FIG. 13, the roll angle value for the dynamic duration is close to 0 in FIG. 14. In the disclosure, the processor 390 of the wearable electronic device 10 may configure a rotation matrix and correct the acceleration data as shown in FIG. 14, and then may determine individually a neck posture depending on an angle of lowering the user head according to a common criterion.

Figure 15:
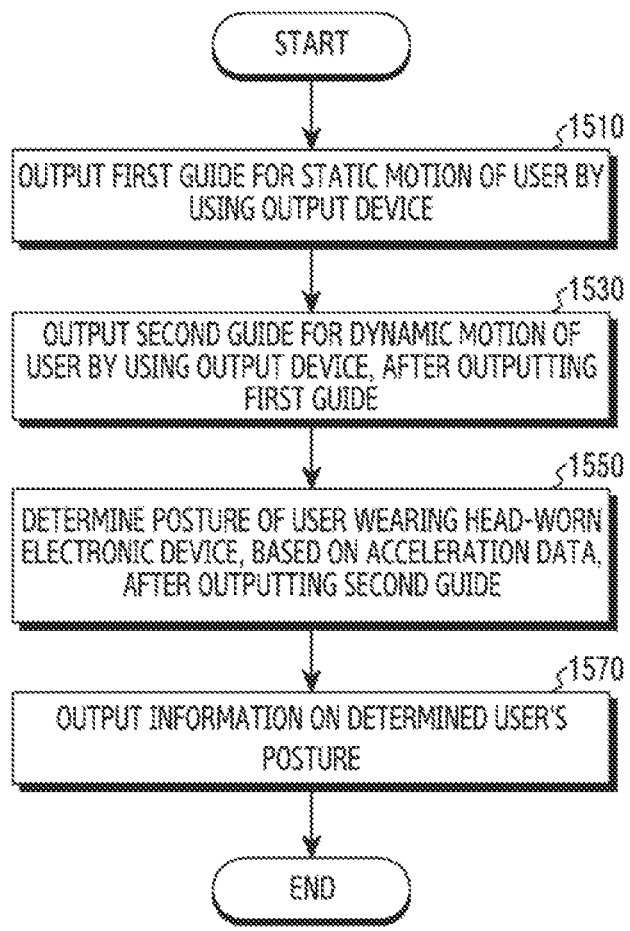
FIG. 15 is a flowchart illustrating a method of providing information on a user's posture determined in a wearable electronic device according to an embodiment.

FIG. 15 is a flowchart illustrating a method of providing information on a user's posture determined in the wearable electronic device 10 according to an embodiment. Hereinafter, a method in which the wearable electronic device 10 determines the user's posture and provides the determined information will be described with reference to FIG. 15 from a perspective of outputting the information to the outside (e.g., a user).

Operations of FIG. 15 may be performed by the wearable electronic device of FIG. 3. Referring to FIG. 15, the processor 390 of the wearable electronic device 10 according to an embodiment may include an operation 1510 of outputting a first guide for a static motion of a user by using an output device of the wearable electronic device 10, an operation 1530 of outputting a second guide for a dynamic motion of the user by using the output device after outputting the first guide, an operation 1550 of determining a posture of a user wearing the wearable electronic device 10, based on acceleration data after outputting the second guide, and an operation 1570 of outputting information on the determined user's posture.

The operation 1510 of FIG. 15 may correspond to the operation 610 of FIG. 6. The operation 1530 of FIG. 15 may correspond to the operation 620 of FIG. 6. The operation 1550 of FIG. 15 may correspond to the operation 470 of FIG. 4.

According to an embodiment, after outputting the first guide and outputting the second guide, in operation 1550, the processor 390 may determine a posture (or a neck posture) of a user wearing the wearable electronic device 10, based on the acceleration data. The processor 390 may calibrate the accelerometer 331 or correct acceleration data output from the accelerometer 331, based on acceleration data while the first guide is output and acceleration data while the second guide is output, and then may determine an angle of lowering a user's head by using the corrected acceleration data to be output. The processor 390 may calibrate the accelerometer 331 or correct acceleration data output from the accelerometer 331, based on acceleration data for a pre-set time after outputting the first guide and acceleration data for a pre-set time after outputting the second guide, and then may determine an angle of lowering a user's head by using the corrected acceleration data to be output. That is, the processor 390 may determine individually a neck posture according to a common criterion, irrespective of an initial wearing posture which differs from one user to another.

In the present disclosure, 'calibrate' and 'correct' may be used with the same meaning.

According to an embodiment, in operation 1570, the processor 390 may output information on the determined user's posture. The processor 390 may control the speaker 341 and/or display module 380 of the wearable electronic device 10 to output information on the user's posture. For example, if the angle of lowering the user's head is greater than a pre-set angle, the processor 390 may output a sound effect or audio guide for the user's posture or output a corresponding video guide, and may induce the user to take a proper neck posture.

According to another embodiment, the processor 390 may transmit to the different electronic device 200 coupled for wireless communication with a head-worn output device a signal which requests an output device of the different electronic device 200 to output information on the user's posture. For example, if the angle of lowering the user's head is greater than the pre-set angle, the processor 390 may transmit to the different electronic device 200 a signal which requests for the output of the information on the user's posture. Upon receiving the signal, the different electronic device 200 may output a corresponding sound effect or audio guide for the user's posture, or may output a corresponding video guide, and may induce the user to taken a proper neck posture.

The disclosure describes a method of determining a user's neck posture by correcting acceleration data output from the accelerometer 331 of the wearable electronic device 10 in consideration of an initial wearing posture. However, the method of the disclosure is not limited to the determining of the user's neck, and may be used in various methods which perform determination by using an angle of lowering a head. For example, the processor 390 may determine a user's neck gesture by using how much the head is lowered over time and/or an angle of lowering the head.

As described above, a wearable electronic device (e.g., the wearable electronic device 10 of FIG. 3) according to an embodiment may include: an accelerometer which outputs acceleration data for a movement of the wearable electronic device; and a processor electrically coupled to the accelerometer. The processor may be configured to determine a roll angle value and a pitch angle value, based on acceleration data for a static duration in which the acceleration data has a static value, estimate a yaw angle value, based on acceleration data for a dynamic duration in which the acceleration data has a dynamic value, correct the acceleration data so that a wearing posture of a user wearing the wearable electronic device corresponds to a reference value in the static duration, based on the roll angle value, the pitch angle value, and the yaw angle value, and determine the posture of the user wearing the wearable electronic device, based on the corrected acceleration data.

According to an embodiment, the posture of the user may include an angle value of lowering a head of the user with respect to a body of the user in a state where the user wears the wearable electronic device.

According to an embodiment, the processor may be configured to determine a rotation matrix which defines a relationship between the acceleration data output from the accelerometer and the posture of the user wearing the wearable electronic device, based on the roll angle value, the pitch angle value, and the yaw angle value, and convert the acceleration data to a reference coordinate system by using the rotation matrix to determine the posture of the user wearing the wearable electronic device. The reference coordinate may be a coordinate system in which forward, right, and lower directions of the user wearing the wearable electronic device in the static duration are respectively set to an x-axis, a y-axis, and a z-axis.

According to an embodiment, the wearable electronic device may further include an output device which outputs audio or video data. The processor may be configured to output a first guide for a static motion of the user by using the output device, determine the roll angle value and the pitch angle value, based on the acceleration data for the static motion, output a second guide for a dynamic motion of the user by using the output device, and estimate the yaw angle value, based on the acceleration data for the dynamic motion.

According to an embodiment, the static motion may be a motion in which the user looks straight ahead while wearing the wearable electronic device on the user's head. The dynamic motion may be a motion in which the user nods the user's head up and down while wearing the wearable electronic device on the user's head.

According to an embodiment, in order for the processor to estimate the yaw angle value, among yaw angle candidate values between 0 and 360 degrees, a yaw angle candidate value of which a variation of the roll angle value is the smallest, or a yaw angle candidate value of which a variation of the roll angle value is the smallest and a variation of the pitch angle value is greatest, for the dynamic duration, may be determined as the yaw angle value.

According to an embodiment, in order for the processor to estimate the yaw angle value, among yaw angle candidate values between 0 and 90 degrees, one yaw angle candidate value may be determined based on a variation of the roll angle value and a sign of the pitch angle value or a variation of the pitch angle value and a sign of the roll angle value for the dynamic duration. The determined yaw angle candidate value or a value obtained by adding 90 degrees, 180 degrees, or 270 degrees to the determined yaw angle value may be determined as the yaw angle value.

According to an embodiment, the wearable electronic device may not include a gyro sensor and/or a geomagnetic sensor.

As described above, a method of determining a posture of a user by using an accelerometer (e.g., the accelerometer 331 of FIG. 3) of a wearable electronic device (e.g., the wearable electronic device 10 of FIG. 3) may include: determining a roll angle value and a pitch angle value, based on acceleration data for a static duration in which the acceleration data output from the accelerometer has a static value; estimating a yaw angle value, based on acceleration data for a dynamic duration in which the acceleration data has a dynamic value; correcting the acceleration data so that a wearing posture of a user wearing the wearable electronic device corresponds to a reference value in the static duration, based on the roll angle value, the pitch angle value, and the yaw angle value; and determining the posture of the user wearing the wearable electronic device, based on the corrected acceleration data.

According to an embodiment, the posture of the user may include an angle value of lowering a head of the user with respect to a body of the user in a state where the user wears the wearable electronic device.

According to an embodiment, the correcting of the acceleration data may include: determining a rotation matrix which defines a relationship between the acceleration data output from the accelerometer and the posture of the user wearing the wearable electronic device, based on the roll angle value, the pitch angle value, and the yaw angle value; and converting the acceleration data to a reference coordinate system by using the rotation matrix. The reference coordinate may be a coordinate system in which forward, right, and lower directions of the user wearing the wearable electronic device in the static duration are respectively set to an x-axis, a y-axis, and a z-axis.

According to an embodiment, the determining of the roll angle value and the pitch angle value may include: outputting a first guide for a static motion of the user by using an output device of the wearable electronic device; and determining the roll angle value and the pitch angle value, based on the acceleration data for the static motion. The estimating of the yaw angle value may include: outputting a second guide for a dynamic motion of the user by using the output device; and estimating the yaw angle value, based on the acceleration data for the dynamic motion.

According to an embodiment, the static motion may be a motion in which the user looks straight ahead while wearing the wearable electronic device on the user's head. The dynamic motion may be a motion in which the user nods the user's head up and down while wearing the wearable electronic device on the user's head.

According to an embodiment, the estimating of the yaw angle may include, among yaw angle candidate values between 0 and 360 degrees, determining a yaw angle candidate value of which a variation of the roll angle value is the smallest, or a yaw angle candidate value of which a variation of the roll angle value is the smallest and a variation of the pitch angle value is greatest, for the dynamic duration, as the yaw angle value.

According to an embodiment, the estimating of the yaw angle value may include: among yaw angle candidate values between 0 and 90 degrees, determining one yaw angle candidate value, based on a variation of the roll angle value and a sign of the pitch angle value or a variation of the pitch angle value and a sign of the roll angle value for the dynamic duration; and determining the determined yaw angle candidate value or a value obtained by adding 90 degrees, 180 degrees, or 270 degrees to the determined yaw angle value as the yaw angle value.

As described above, a wearable electronic device may include: an accelerometer which outputs acceleration data for a movement of the wearable electronic device; an output device which outputs audio or video data; and a processor electrically coupled to the accelerometer and the output device. The processor may be configured to output a first guide for a static motion of the user by using the output device, output a second guide for a dynamic motion of the user by using the output device, after outputting the first guide, and output information on a posture of a user wearing the wearable electronic device, determined based on the acceleration data, after outputting the second guide.

According to an embodiment, the posture of the user may include an angle value of lowering a head of the user with respect to a body of the user in a state where the user wears the wearable electronic device.

According to an embodiment, the processor may be configured to correct the acceleration data so that a wearing posture of a user wearing the wearable electronic device corresponds to a reference value in the static duration, determine the posture of the user wearing the wearable electronic device, based on the corrected acceleration data, and outputting information on the determined user's posture.

According to an embodiment, the static motion may be a motion in which the user looks straight ahead while wearing the wearable electronic device on the user's head. The dynamic motion may be a motion in which the user nods the user's head up and down while wearing the wearable electronic device on the user's head.

According to an embodiment, the dynamic motion may be a motion in which only the pitch value changes among the roll value, the pitch value, and the yaw value while moving.

Certain embodiments have been described with a degree of particularity and specificity. It shall be understood that the embodiments are only described by way of example, and this disclosure shall not be considered limited to the embodiments described herein. Moreover, various modification, revisions, adaptations, omission of parts, and addition of parts can be made to the embodiments without departing from the spirit and scope of this disclosure.

The invention claimed is:

1. A wearable electronic device comprising:
an accelerometer which outputs acceleration data for a movement of the wearable electronic device;
a speaker which outputs audio data;
at least one processor; and
memory storing instructions,
wherein the instructions, when executed by the at least one processor, cause the wearable electronic device to:
output a first guide using the speaker, the first guide commanding a user to keep their head still;
obtain static acceleration data within a preset time after outputting the first guide;
output a second guide using the speaker, the second guide commanding the user to rotate their head about a pitch axis;
obtain dynamic acceleration data within a preset time after outputting the second guide;
determine a roll angle value and a pitch angle value, based on static acceleration data;
estimate a yaw angle value, based on dynamic acceleration data, the roll angle value and the pitch angle value;
correct another acceleration data being output from the accelerometer, based on the roll angle value, the pitch angle value, and the estimated yaw angle value; and
determine the posture of the user wearing the wearable electronic device, based on the corrected another acceleration data.

2. The wearable electronic device of claim 1, wherein the posture of the user includes an angle value of lowering a head of the user with respect to a body of the user when the user wears the wearable electronic device.

3. The wearable electronic device of claim 1, wherein the instructions, when executed by the at least one processor, cause the wearable electronic device to:
determine a rotation matrix defining a relationship between a roll, pitch and yaw axis of the accelerometer and the roll pitch and yaw axis of the user's head, based on the roll angle value, the pitch angle value, and the estimated yaw angle value; and
convert the another acceleration data to a reference coordinate system by using the rotation matrix to determine the posture of the user wearing the wearable electronic device.

4. The wearable electronic device of claim 1, wherein the yaw angle value is determined as a value of which a vibration of the roll angle value is the smallest, or is determined as a value of which a variation of the roll angle value is the smallest and a variation of the pitch angle value is the greatest, for the dynamic duration.

5. The wearable electronic device of claim 1,
wherein commanding the user to keep their head still comprises commanding the user to look straight ahead while wearing the wearable electronic device on the user's head, and
wherein commanding the user to rotate their head comprises commanding the user to rotate their head about the pitch axis while wearing the wearable electronic device on the user's head.

6. The wearable electronic device of claim 1, wherein the instructions, when executed by the at least one processor, cause the wearable electronic device to:
determine, among yaw angle candidate values between 0 and 360 degrees, a yaw angle candidate value of which a variation of the roll angle value is the smallest while receiving the dynamic acceleration data, or a yaw angle candidate value of which a variation of the roll angle value is the smallest and a variation of the pitch angle value is greatest while receiving the dynamic acceleration data, as the yaw angle value.

7. The wearable electronic device of claim 1, wherein the instructions, when executed by the at least one processor, cause the wearable electronic device to:
determine, among yaw angle candidate values between 0 and 90 degrees, one yaw angle candidate value based on a variation of the roll angle value and a sign of the pitch angle value or a variation of the pitch angle value and a sign of the roll angle value while receiving the dynamic acceleration data, and
determine the determined yaw angle candidate value or a value obtained by adding 90 degrees, 180 degrees, or 270 degrees to the determined yaw angle value as the yaw angle value.

8. The wearable electronic device of claim 1, wherein the wearable electronic device does not include a gyro sensor and/or a geomagnetic sensor.

9. A method of determining a posture of a user by using an accelerometer of a wearable electronic device, the method comprising:
outputting a first guide using a speaker, the first guide commanding a user to keep their head still;
obtaining static acceleration data within a preset time after outputting the first guide;
outputting a second guide using the speaker, the second guide commanding the user to rotate their head about a pitch axis;
obtaining dynamic acceleration data within a preset time after outputting the second guide;
determining a roll angle value and a pitch angle value, based on static acceleration data;
estimating a yaw angle value, based on dynamic acceleration data, the roll angle value and the pitch angle value;
correcting another acceleration data being output from the accelerometer, based on the roll angle value, the pitch angle value, and the estimated yaw angle value; and
determining the posture of the user wearing the wearable electronic device, based on the corrected another acceleration data.

10. The method of claim 9, wherein the posture of the user includes an angle value of lowering a head of the user with respect to a body of the user when the user wears the wearable electronic device.

11. The method of claim 9, wherein the correcting of the acceleration data comprises:
determining a rotation matrix defining a relationship between the roll, pitch, and yaw axis of the accelerometer and the roll, pitch, and yaw axis of the user's head, based on the roll angle value, the pitch angle value, and the estimated yaw angle value; and
converting the another acceleration data to a reference coordinate system by using the rotation matrix.

12. The method of claim 9,
wherein commanding the user to keep their head still comprises commanding the user to look straight ahead while wearing the wearable electronic device on the user's head, and
wherein commanding the user to rotate their head comprises commanding the user to rotate their head about the pitch axis while wearing the wearable electronic device on the user's head.

13. The method of claim 9, wherein the estimating of the yaw angle comprises, among yaw angle candidate values between 0 and 360 degrees, determining a yaw angle candidate value of which a variation of the roll angle value is the smallest while receiving the dynamic acceleration data, or a yaw angle candidate value of which a variation of the roll angle value is the smallest and a variation of the pitch angle value is greatest while receiving the dynamic acceleration data, as the yaw angle value.

14. The method of claim 9, wherein the estimating of the yaw angle value comprises:
   among yaw angle candidate values between 0 and 90 degrees, determining one yaw angle candidate value, based on a variation of the roll angle value and a sign of the pitch angle value or a variation of the pitch angle value and a sign of the roll angle value while receiving the dynamic acceleration data; and
   determining the determined yaw angle candidate value or a value obtained by adding 90 degrees, 180 degrees, or 270 degrees to the determined yaw angle value as the yaw angle value.

15. A wearable electronic device comprising:
   an accelerometer which outputs acceleration data for a movement of the wearable electronic device in real time;
   a speaker which outputs audio data; and
   at least one processor electrically coupled to the accelerometer and the speaker; and
   memory storing instructions,
   wherein the instructions, when executed by the at least one processor, cause the wearable electronic device to:
   output a first guide using the speaker, the first guide commanding a user to keep their head still;
   obtain static acceleration data within a preset time after outputting the first guide;
   output a second guide using the speaker, the second guide commanding the user to rotate their head about a pitch axis;
   obtain dynamic acceleration data within a preset time after outputting the second guide;
   determine a roll angle value and a pitch angle value, based on static acceleration data;
   estimate a yaw angle value, based on dynamic acceleration data, the roll angle value and the pitch angle value;
   correct another acceleration data being output from the accelerometer, based on the roll angle value, the pitch angle value, and the estimated yaw angle value;
   determine the posture of the user wearing the wearable electronic device, based on the corrected another acceleration data; and
   output information on the posture of the user wearing the wearable electronic device.

16. The wearable electronic device of claim 15, wherein the posture of the user includes an angle value of lowering a head of the user with respect to a body of the user in a state where the user wears the wearable electronic device.

17. The wearable electronic device of claim 15, wherein the instructions, when executed by the at least one processor, cause the wearable electronic device to:
   correct the another acceleration data, based on acceleration data received in response to outputting the first guide and acceleration data received in response to outputting the second guide;
   determine the posture of the user wearing the wearable electronic device, based on the corrected acceleration data; and
   outputting information on the determined user's posture.

18. The wearable electronic device of claim 15,
   wherein the first guide corresponds to when the user looks straight ahead while wearing the wearable electronic device on the user's head, and
   wherein the second guide commands the user to rotate their head about a predetermined one of a roll, pitch, and yaw axis.

19. The wearable electronic device of claim 15, wherein rotate the head is a motion in which only the pitch value changes among the roll value, the pitch value, and the yaw value while moving.

* * * * *